(12) United States Patent
Zdravkovic et al.

(10) Patent No.: US 7,032,296 B2
(45) Date of Patent: Apr. 25, 2006

(54) SELF-PIERCING FASTENING SYSTEM

(75) Inventors: Srecko Zdravkovic, Sterling Heights, MI (US); Sivakumar Ramasamy, Shelby Township, MI (US)

(73) Assignee: Newfrey LLC, Newark, DE (US)

( * ) Notice: Subject to any disclaimer, the term of this patent is extended or adjusted under 35 U.S.C. 154(b) by 70 days.

(21) Appl. No.: 10/735,305

(22) Filed: Dec. 11, 2003

(65) Prior Publication Data

US 2005/0111911 A1 May 26, 2005

Related U.S. Application Data

(60) Provisional application No. 60/524,360, filed on Nov. 21, 2003.

(51) Int. Cl.
*B23P 21/00* (2006.01)
(52) U.S. Cl. .............................. 29/709; 29/712; 29/714; 29/715; 29/716; 29/798; 29/243.53; 29/407.05; 29/432.1; 29/509; 29/525.05; 29/525.06; 411/179; 411/180; 411/427; 411/501; 403/278; 403/282; 403/283
(58) Field of Classification Search ............. 29/407.01, 29/407.05, 407.08, 505, 509, 432.1, 432.2, 29/512, 525.02, 525.05, 525.06, 525.11, 709, 29/712, 714, 715, 716, 798, 243.53; 411/427, 411/487, 493, 501, 411, 179, 180; 403/278, 403/280, 282, 283, 285
See application file for complete search history.

(56) References Cited

U.S. PATENT DOCUMENTS

| | | | |
|---|---|---|---|
| 1,500,021 A | 7/1924 | Wilson | |
| 3,281,171 A | 10/1966 | Hughes | |
| 3,942,235 A | 3/1976 | Goodsmith et al. | |
| 3,946,478 A | 3/1976 | Goodsmith et al. | |
| 3,961,408 A | 6/1976 | Goodsmith et al. | |
| 3,969,808 A | 7/1976 | Goodsmith et al. | |
| 3,969,809 A | 7/1976 | Pouch et al. | |
| 3,971,116 A | 7/1976 | Goodsmith et al. | |
| 4,124,050 A | 11/1978 | Ackerman | |
| 4,242,793 A | 1/1981 | Matthews et al. | |
| 4,338,694 A | 7/1982 | Steward et al. | |
| 4,348,796 A | 9/1982 | Smallegan | |
| 4,370,794 A | 2/1983 | Bien et al. | |
| 4,442,584 A | 4/1984 | Smallegan | |

(Continued)

FOREIGN PATENT DOCUMENTS

CA 2 374 217 A1 11/2000

(Continued)

OTHER PUBLICATIONS

Brochure by Pierce Fastening Technology entitled "Pierce Fasteners: The fasteners Designed for Flexibility"; 14 pages; (published prior to Nov. 21, 2003).

(Continued)

*Primary Examiner*—Marc Jimenez
*Assistant Examiner*—Jermie E. Cozart
(74) *Attorney, Agent, or Firm*—Harness, Dickey & Pierce, P.L.C.

(57) ABSTRACT

The preferred embodiment of a fastening system includes a self-piercing fastener having a thread-like pattern. In another aspect of the present invention, a fastener insertion machine employs an electromagnetic actuator without fluid actuation. A further aspect of the present invention uses a rotary-to-linear transmission within the machine to advance the fastener. In still another aspect of the present invention a self-piercing fastener is a clinch nut or a clinch stud.

37 Claims, 5 Drawing Sheets

U.S. PATENT DOCUMENTS

| | | | |
|---|---|---|---|
| 4,476,599 | A | 10/1984 | Steward et al. |
| 4,484,385 | A | 11/1984 | Woods |
| 4,505,416 | A | 3/1985 | Smallegan |
| 4,532,664 | A | 8/1985 | Steward et al. |
| 4,555,838 | A | 12/1985 | Muller |
| 4,574,453 | A | 3/1986 | Sawdon |
| 4,610,072 | A | 9/1986 | Muller |
| 4,630,363 | A | 12/1986 | Woods |
| 4,633,560 | A | 1/1987 | Muller |
| 4,642,869 | A | 2/1987 | Muller |
| 4,649,753 | A | 3/1987 | Goodsmith |
| 4,653,970 | A | 3/1987 | Ballantyne |
| 4,679,690 | A | 7/1987 | Steward et al. |
| 4,690,599 | A | 9/1987 | Shinjo |
| 4,700,470 | A | 10/1987 | Muller |
| 4,711,021 | A | 12/1987 | Muller |
| 4,713,872 | A | 12/1987 | Muller |
| 4,724,610 | A | 2/1988 | Muller |
| 4,727,646 | A | 3/1988 | Muller |
| 4,729,163 | A | 3/1988 | Muller et al. |
| 4,765,057 | A | 8/1988 | Muller |
| 4,802,803 | A | 2/1989 | Muller |
| 4,810,143 | A | 3/1989 | Muller |
| 4,825,527 | A | 5/1989 | Ladouceur |
| 4,831,698 | A | 5/1989 | Muller |
| 4,893,394 | A | 1/1990 | Muller |
| 4,911,592 | A | 3/1990 | Muller |
| 4,915,558 | A | 4/1990 | Muller |
| 5,020,950 | A | 6/1991 | Ladouceur |
| 5,056,207 | A | 10/1991 | Ladouceur |
| 5,067,224 | A | 11/1991 | Muller |
| 5,072,518 | A | 12/1991 | Scott |
| 5,092,724 | A | 3/1992 | Muller |
| 5,140,735 | A | 8/1992 | Ladouceur |
| 5,146,672 | A | 9/1992 | Muller |
| 5,172,467 | A | 12/1992 | Muller |
| 5,174,018 | A | 12/1992 | Muller |
| 5,207,588 | A | 5/1993 | Ladouceur et al. |
| 5,208,963 | A | 5/1993 | Ladouceur |
| 5,237,733 | A | 8/1993 | Ladouceur et al. |
| 5,239,740 | A | 8/1993 | Ladouceur |
| 5,340,251 | A | 8/1994 | Takahashi et al. |
| 5,441,417 | A | 8/1995 | Ladouceur et al. |
| 5,445,483 | A | 8/1995 | Fultz |
| 5,487,215 | A | 1/1996 | Ladouceur |
| 5,502,884 | A | 4/1996 | Ladouceur |
| 5,502,888 | A | 4/1996 | Takahashi et al. |
| 5,531,552 | A | 7/1996 | Takahashi et al. |
| 5,533,250 | A | 7/1996 | Ladouceur |
| 5,549,430 | A | 8/1996 | Takahashi et al. |
| 5,560,094 | A | 10/1996 | Ladouceur et al. |
| 5,564,873 | A | 10/1996 | Ladouceur et al. |
| 5,617,652 | A | 4/1997 | Muller |
| 5,644,830 | A | 7/1997 | Ladouceur et al. |
| RE35,619 | E | 10/1997 | Muller |
| 5,673,472 | A | 10/1997 | Muller |
| 5,722,139 | A | 3/1998 | Ladouceur et al. |
| 6,220,804 | B1 | 4/2001 | Pamer et al. |
| 6,263,560 | B1 | 7/2001 | Edwards |
| 6,276,050 | B1 | 8/2001 | Mauer et al. |
| 6,325,584 | B1 | 12/2001 | Marko et al. |
| 6,502,008 | B1 | 12/2002 | Maurer et al. |
| 6,732,420 | B1 * | 5/2004 | Wang et al. ............. 29/525.06 |
| 6,789,309 | B1 * | 9/2004 | Kondo ........................ 29/709 |
| 6,802,682 | B1 * | 10/2004 | Stevenson et al. .......... 411/501 |
| 2001/0001166 | A1 | 5/2001 | Ladouceur et al. |
| 2001/0027597 | A1 * | 10/2001 | Mauer et al. ............ 29/407.04 |
| 2002/0029450 | A1 * | 3/2002 | Kondo .................... 29/407.01 |
| 2002/0166221 | A1 | 11/2002 | Clew |
| 2002/0172573 | A1 | 11/2002 | Pamer et al. |
| 2003/0101566 | A1 | 6/2003 | Ladouceur |

FOREIGN PATENT DOCUMENTS

| | | |
|---|---|---|
| DE | 199 09 821 A1 | 9/2000 |
| DE | 199 22 864 A1 | 12/2000 |
| GB | 2069088 | 2/1981 |
| WO | WO 02/073045 | 9/2002 |

OTHER PUBLICATIONS

KAPtifast brochure for KAPti-nut entitled "High Strength Captive Nuts for Sheet Metal". (published prior to Nov. 21, 2003).

"Perma-Nut Inserts for Thin Materials"; 2 pages (published prior to Nov. 21, 2003).

Partial European Search Report, 4 pages, dated Feb. 2, 2005.

* cited by examiner

SELF-PIERCING FASTENING SYSTEM

CROSS REFERENCE TO RELATED APPLICATIONS

This application claims priority to Provisional Application U.S. Ser. No. 60/524,360, filed Nov. 21, 2003, which is incorporated by reference herein.

BACKGROUND OF THE INVENTION

The present invention generally relates to fastening systems and more particularly pertains to a self-piercing, threaded fastener, joint and machine.

It has recently become known to employ hydraulic and electric motor actuated machines to insert self-piercing rivets into sheet metal panels. For example, an electric motor-based device is disclosed in U.S. Pat. No. 6,276,050 entitled "Riveting System and Process for Forming a Riveted Joint," which issued to Mauer et al. on Aug. 21, 2001; this patent is incorporated by reference herein.

A conventional clinch nut has also been employed for use with a single thickness, sheet metal, automotive panel. A slug is pierced from the panel by the nut and a ram of a setting machine thereafter removes the slug. Thus, an unobstructed hole is present from one side of the panel to the other through the nut. This is disadvantageous in that dirt, vehicle exhaust and other debris can move from one side of the panel to the other through the hole. Another conventional system provides a clinch stud used with a pre-drilled hole in a single sheet metal panel. A pneumatic setting machine is employed for both the traditional clinch nut and clinch stud systems. This has considerably different controllability and operational characteristics than an electric motor actuator. Furthermore, other traditional clinch nuts and clinch studs employ a pre-pierced panel opening, prior to insertion of the nut or stud, which adds an expensive extra manufacturing step and complexity to the setting tool, as well as adds undesirable additional tolerance variations which may lead to the creation of vehicle noise and vibration at the joint.

SUMMARY OF THE INVENTION

In accordance with the present invention, the preferred embodiment of a fastening system includes a self-piercing fastener having a thread-like pattern. In another aspect of the present invention, a fastener insertion machine employs an electromagnetic actuator without fluid actuation. A further aspect of the present invention uses a rotary-to-linear transmission within the insertion machine to advance the fastener. Yet another aspect of the present invention provides a clinch fastener for joining multiple workpieces. Additionally, another aspect of the present invention provides a leakproof joint between the fastener and the workpiece. A leading end of a threaded fastener is encapsulated within a panel in a further aspect of the present invention. In still another aspect of the present invention, a self-piercing fastener is a clinch nut or a clinch stud. A method of attaching a fastener to at least one workpiece is also provided.

The fastening system of the present invention is advantageous over conventional devices in that a joint between a workpiece and a fastener is created which prevents the passage of dirt, debris and exhaust through the joint area. Another advantage of the present invention is the real-time controllability, changes, and accuracy of the insertion machine used to set the fastener, realized through use of the electromagnetic actuator, a real-time sensing system and control logic. This improves automatic fastening characteristic recognition, quality, flexibility and result tracking. Machine and processing costs and complexity are additionally reduced through the self-piercing nature of the fastener and process. Moreover, the fastening system of the present invention is advantageously suitable for use in creating a two-way joint; the clinching section of the fastener joins two or more sheet metal panels while the body of the fastener also secures a component such as an electrical connector, trim panel and/or a circuit board. Additional features and benefits will be further disclosed hereinafter with reference to the appended claims and accompanying drawings.

DETAILED DESCRIPTION OF THE PREFERRED EMBODIMENT

Figure 1:
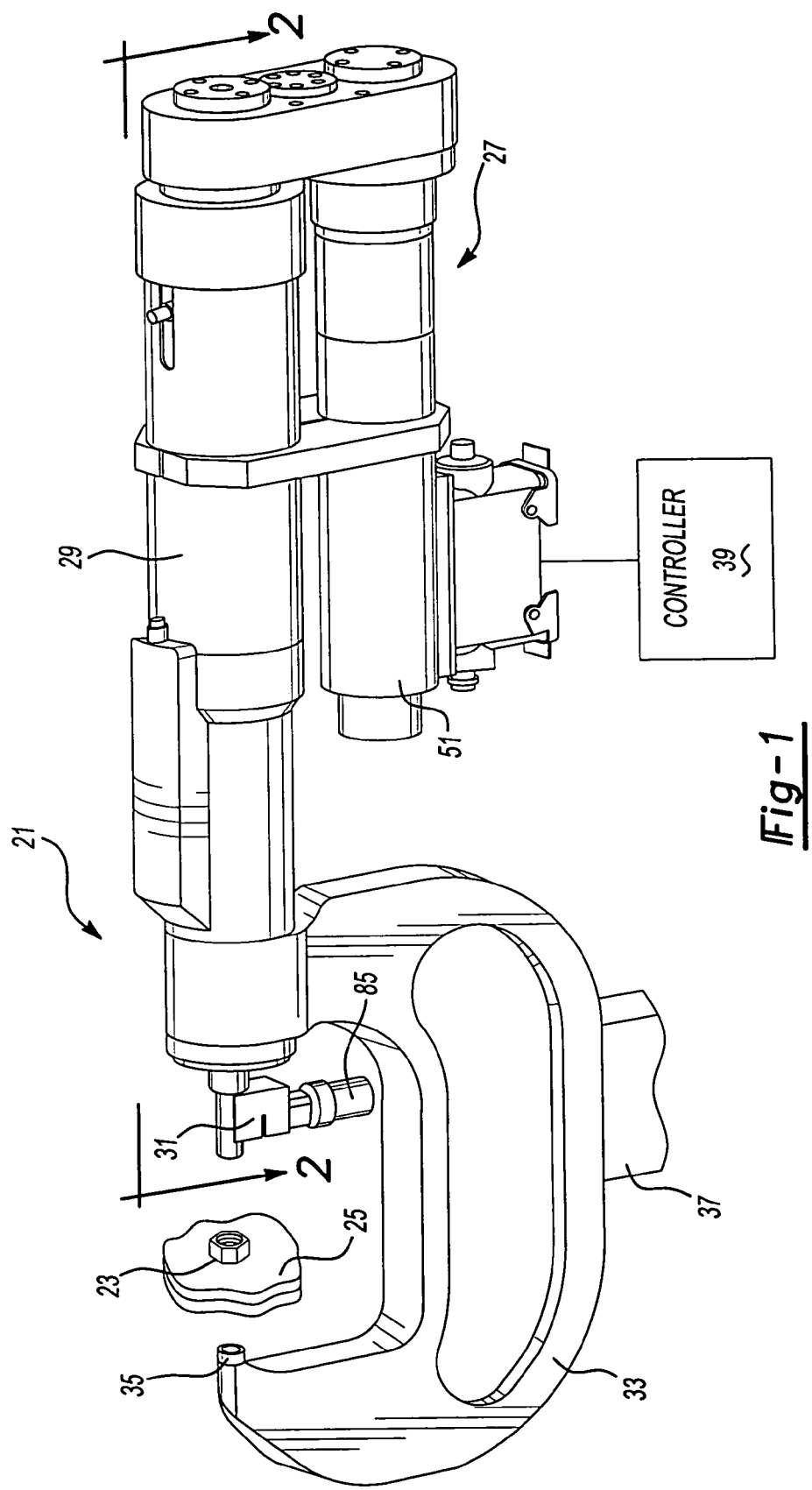
FIG. 1 is a perspective view showing an installation machine and joint employed in the preferred embodiment of the fastening system of the present invention.
Figure 2:
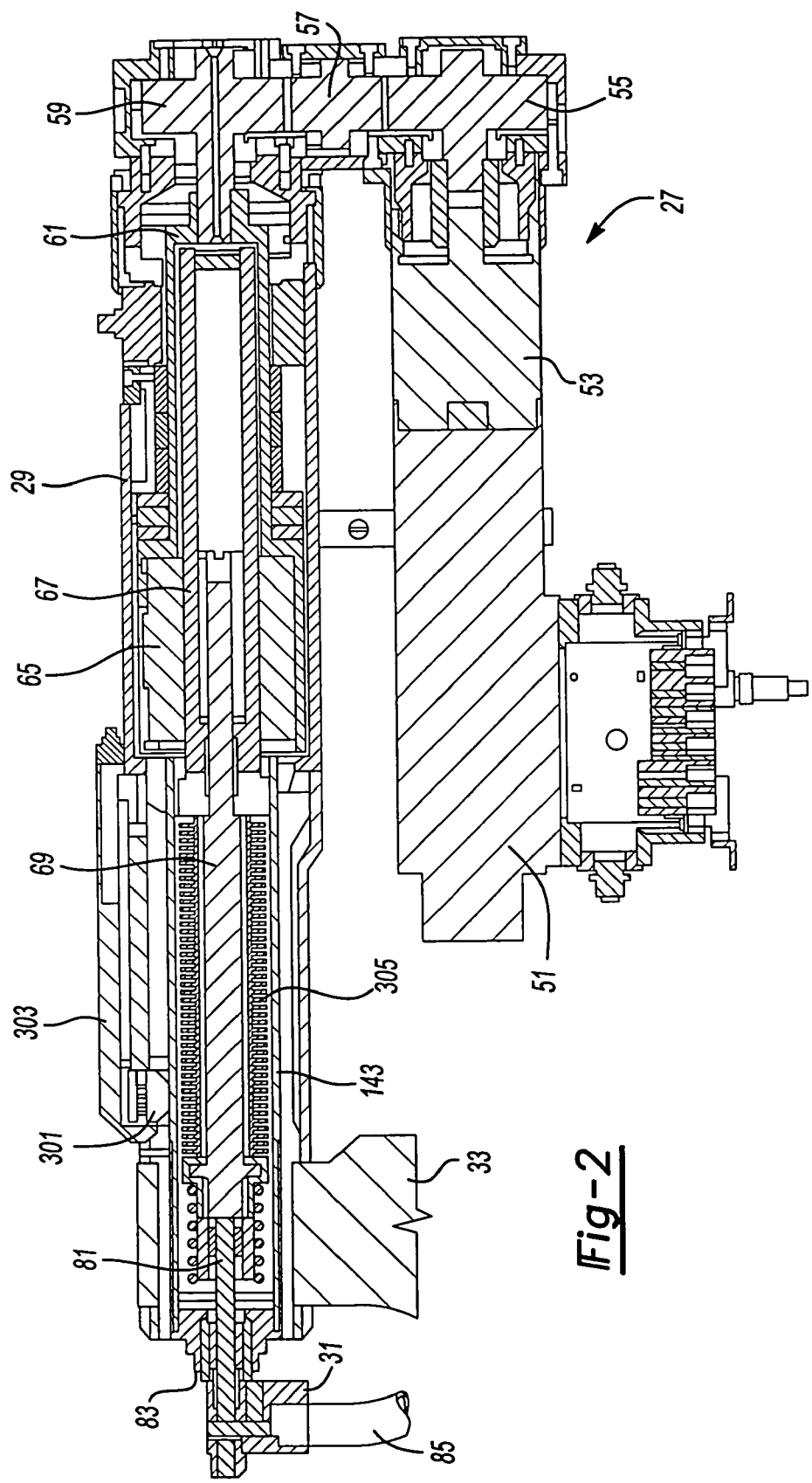
FIG. 2 is a longitudinal cross-sectional view, taken along line 2—2 of FIG. 1, showing the preferred embodiment installation machine
Figure 3:
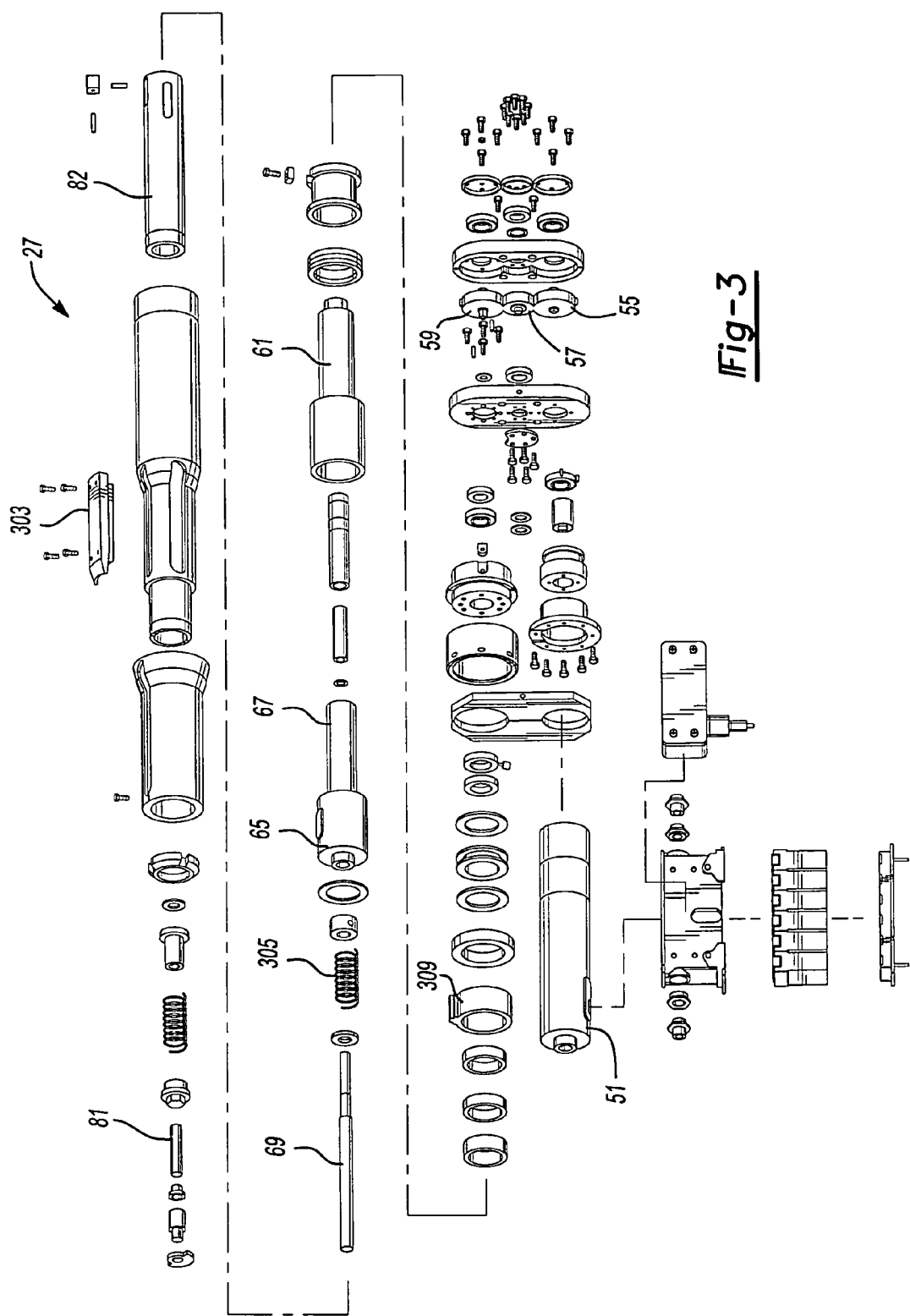
FIG. 3 is an exploded perspective view showing the preferred embodiment installation machine.
Figure 4:
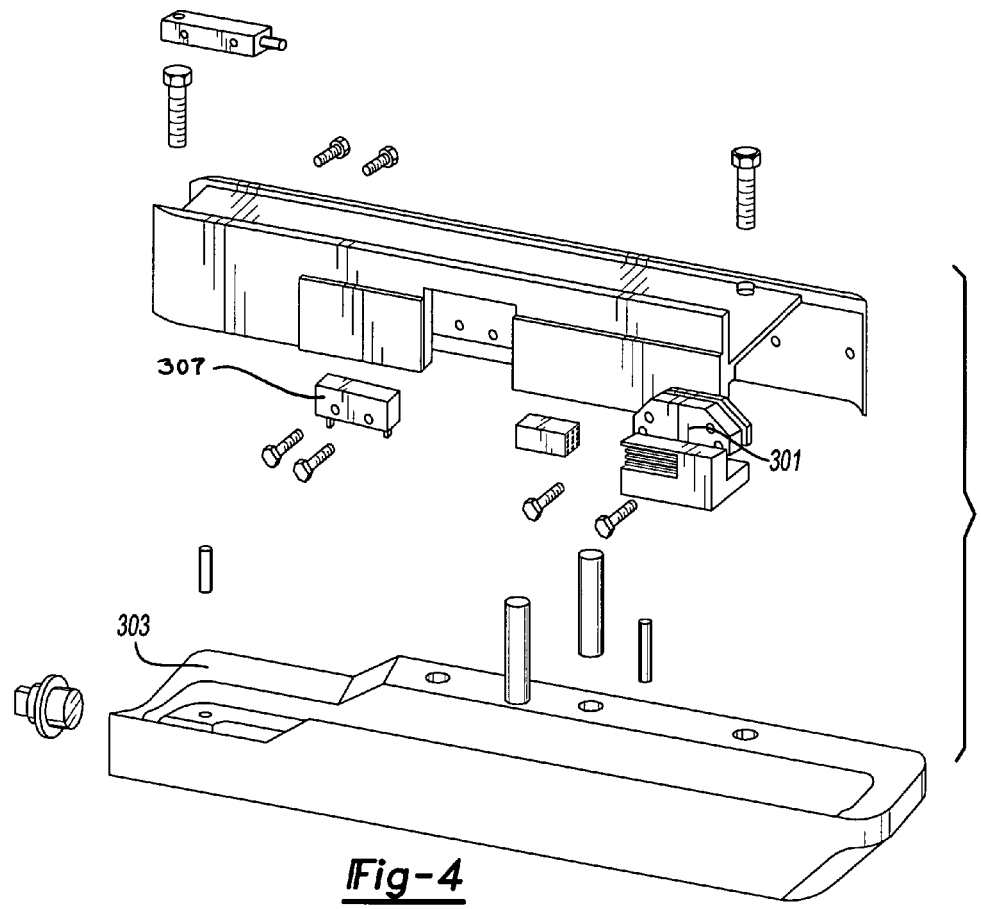
FIG. 4 is an exploded perspective view showing a sensor assembly employed in the preferred embodiment installation machine.

Referring to FIGS. 1–3, the preferred embodiment of a fastening system 21 of the present invention includes a fastener 23, a pair of sheet metal workpieces 25 and an installation machine 27. Machine 27 has a set of outer housings 29, a receiver assembly or nose piece 31, a C-frame 33 and a stationary die 35 mounted to the C-frame. An arm of an articulating robot 37 is preferably mounted to C-frame 33 but may be alternately mounted to housing 29. A computer controller 39 is connected to machine 27 and includes a programmable microprocessor, memory, an input device such as a keyboard or touch-screen, and an output device such as a display screen, CRT, display lights or the like.

An electric motor 51 has an internal armature which rotates when electromagnetically energized. The armature operably causes rotation of an output shaft, which in turn, rotates a set of two or three reduction, spur gears 55, 57 and 59. Spur gear 59 thereby rotates a nut housing 61 which is coupled to a rotatable ball or nut 65. Rotation of nut 65 causes an enmeshed spindle 67 to linearly advance and retract along a longitudinal axis. A punch holder 69 and an attached punch 81 linearly move with spindle 67. Parts 55, 57, 59, 61, 65, 67 and 69 act as a rotary-to-linear motion transmission thereby linearly advancing and retracting setting punch 81, a workpiece clamp 82 and an attached clamp ring 83.

Controller 39 automatically recalls prestored characteristic data about the joint to be made at each predetermined location on workpiece 25, which may differ from the preceding or successor joints; for example, as to depth of fastener insertion, fastener type (e.g., length, material, shape, etc.), insertion speed, clamp force, workpiece thickness (e.g., use of a single sheet, use of two sheets, use of three sheets, nonuniform thickness of any combination thereof, etc.), or the like. Accordingly, the pre-stored, fastener characteristics defining the installation profile operation to be performed by the machine and the desired fastener to be selected are automatically retrieved from memory by the microprocessor. A series of fasteners 23 are sequentially fed to a receiver area in nose piece 31 by pneumatic pressure through a feed hose 85 from a feeder assembly. One fastener 23 is aligned with punch 81 and one or more signals indicating presence of fastener 23 in its correct position and actual fastener length are sent by a sensor 301 to controller 39 in real-time for comparison to the pre-stored data. Sensor 301 is a linear encoder mounted within a sensor housing 303. Thereafter, electric motor 51 is automatically energized by controller 39 to allow a spring 305 to outwardly bias a clamp ring 83 against a punch-side surface of workpiece 25, and to also advance punch 81 which drives fastener 23. One or more signals indicating thickness of workpieces 25 are also sent by sensor 301 to controller 39 for a real-time comparison to the pre-stored data. A position sensor 307 is further provided within sensor housing 303 for sensing when punch 81 is in its fully retracted position. Furthermore, a load cell sensor 309 is mounted adjacent a proximal end of nut housing 61 to provide real-time information to controller 39 indicative of actual fastener setting force required for a comparison with the pre-stored data; this data indirectly verifies or allows variable control of depth of fastener insertion and the like. Sensors 301, 307 and 309 are connected to controller 39.

The actual transmission force, motor current, motor amperage draw or the like is automatically sensed by the sensors during fastener installation wherein controller 39 automatically determines if a satisfactory joint was created and sends the appropriate output signal indicating success, shuts down the process if unsatisfactory, changes punch speed or travel in real time if desired, and adds the record to historical quality control tracking data. Thereafter, the punch is retracted and machine is robotically moved to the next joint area or the workpiece is moved.

Figure 5A:
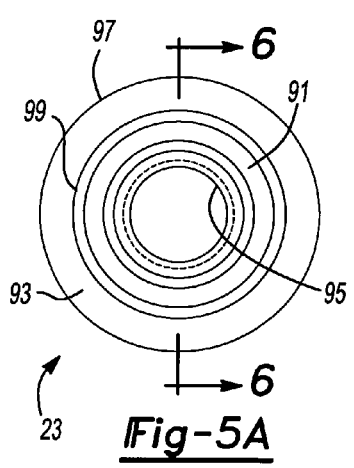
FIG. 5A is an end elevational view showing a nut fastener employed in a preferred embodiment of the fastening system of the present invention, as viewed prior to installation.
Figure 5B:
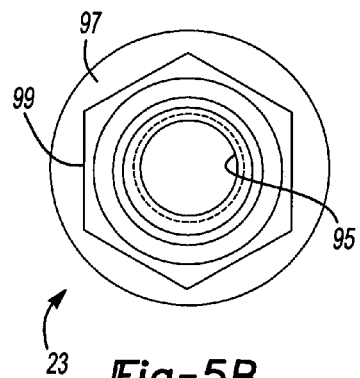
FIG. 5B is an end elevational view showing a nut fastener employed in a first alternate embodiment of the fastening system of the present invention, as viewed prior to installation.
Figure 6:
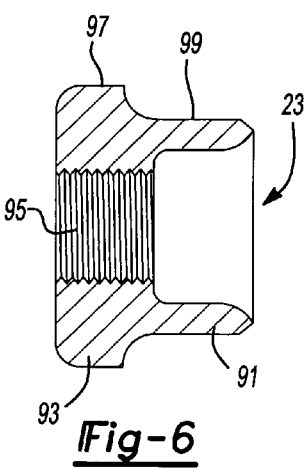
FIG. 6 is a cross-sectional view, taken along line 6—6 of FIG. 5A, showing the preferred embodiment of the nut fastener, as viewed prior to installation.
Figure 7:
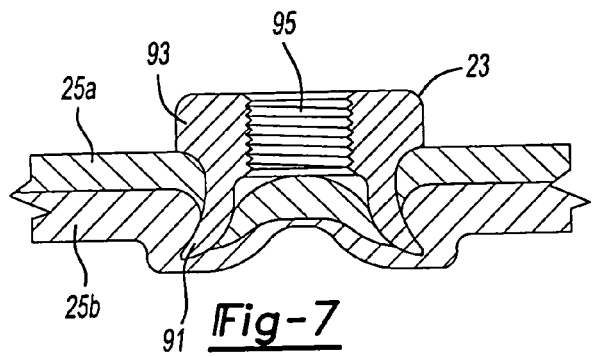
FIG. 7 is a cross-sectional view, similar to that of FIG. 6, showing the joint of the preferred embodiment fastening system, as viewed after installation.

Referring now to FIGS. 1, 2, 5A, 6 and 7, a tapered, circular-cylindrical, distal end 91 of fastener 23, preferably a clinch nut, self-pierces and cuts its own hole completely through the punch-side workpiece 25a and only partially through the die-side workpiece 25b. Distal end 91 is caused to diverge outwardly by die 35 during installation, but fastener 23 is prevented from completely piercing through the die-side workpiece or from directly contacting the die, thereby creating a leakproof joint with distal end 91 encapsulated in die-side workpiece 25b. Fastener 23 preferably serves to secure together two (or more) workpiece panels 25a and 25b. The preferred nut embodiment of fastener 23 further includes an enlarged body 93 having internal, spiral threads 95 lining a bore, and a circular-cylindrical external surface 97. An outside, lateral surface 99 of distal end 91 is also circular-cylindrical, prior to installation, and of a smaller outer diameter than surface 97 of body 93. In the first alternate embodiment illustrated in FIG. 5B, outside, lateral surface 99 of distal end 91 is of a hexagonal, octagonal or other polygonal shape, or has longitudinally extending grooves or ribs, so as to deter undesired rotation of the installed fastener 23 relative to workpiece 25 when a bolt is later attached.

Figure 8:
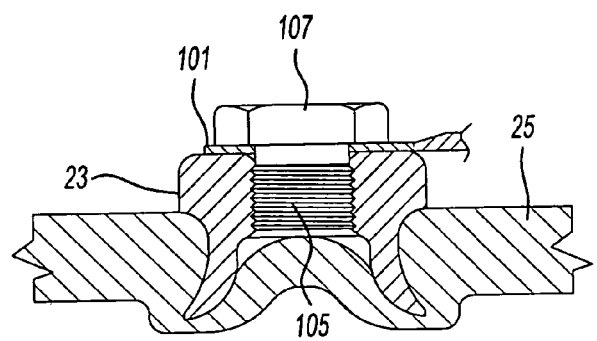
FIG. 8 is a cross-sectional view, similar to that of FIG. 7, showing a second alternate embodiment fastening system of the present invention.
Figure 9:
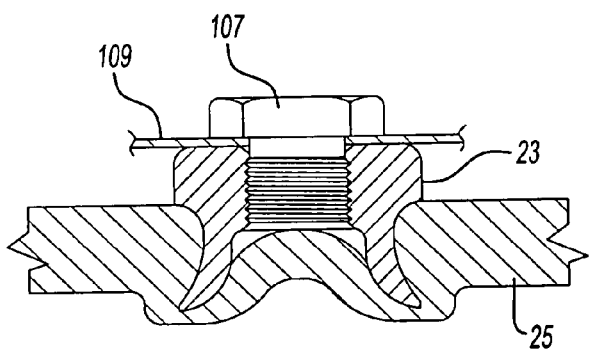
FIG. 9 is a cross-sectional view, similar to that of FIG. 7, showing a third alternate embodiment fastening system of the present invention.

FIGS. 8 and 9 show the subsequent assembly step. In FIG. 8, a second alternate embodiment joint employs a fastener 23, as previously disclosed, attached to a single sheet metal, automotive vehicle, body panel or workpiece 25. An electrical connector component, here a stamped metal eyelet 101 crimped onto an automotive grounding wire, is removably coupled to fastener 23 via an externally threaded shaft 105 of a bolt 107. FIG. 9 illustrates a third alternate embodiment fastening system using an electronic circuit board component 109 secured to fastener 23 by an externally threaded bolt 107; fastener 23 is secured to a computer housing panel, bracket, workpiece 25 or other structure. Workpiece 25 can alternately represent an automotive vehicle body panel and component 109 can represent a polymeric or fibrous interior trim panel. Workpiece 25 is preferably a stamped aluminum or steel sheet but may alternately be a cast metal alloy or other materials suitable for a clinched fastener. Fastener 23 (and 223) is preferably carbon steel, heat treated to 30 and 55 Rc, but may alternately be aluminum or an aluminum alloy depending on the application requirements.

Figure 10:
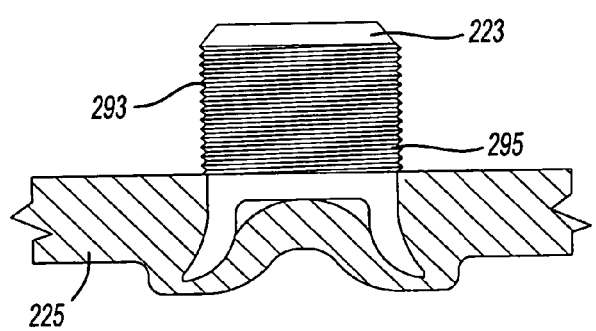
FIG. 10 is a cross-sectional view, similar to that of FIG. 7, showing a fourth alternate embodiment fastening system of the present invention.

As can be observed in FIG. 10, a fourth alternate embodiment fastening system employs a stud fastener 223 which is clinched to a single (or alternately two or more) workpiece 225 in a self-piercing manner and with machinery as previously described with the preferred embodiment. This exemplary fastener 223 is a clinch stud having a longitudinally elongated shaft 293 with an external thread pattern 295 for later engagement by a component and nut. A distal clinching end 297 is encapsulated within and outwardly diverges into workpiece 225, without having to account for a loose slug being cut from the die-side workpiece.

While multiple embodiments of the present invention have been disclosed, it should be appreciated that various changes may be made which still fall within the scope of the present invention. For example, alternate engagement patterns may be employed on the fastener other than threads. It is also envisioned that the quantity and positioning of gears and shafts of the transmission can differ depending on the force reduction or increase, speed, travel, and packaging requirements desired for a specific use. Furthermore, the machine of the present invention may be stationarily mounted to a factory floor rather than movably attached to a robot. A fluid powered fastener setting machine can alternately be employed to create the disclosed joints, however, many operational and quality benefits will not be achieved without use of the preferred electric motor-actuated, rotary-to-linear driven machine disclosed. While various materials have been disclosed, it should be appreciated that a variety of other materials can be employed. It is intended by the following claims to cover these and any other departures from the disclosed embodiments which fall within the true spirit of this invention.

The invention claimed is:

1. A fastening system comprising:
   a threaded fastener, threads on the fastener being accessible even after fastener setting; and
   a machine automatically operable to drive the fastener, the machine comprising:
   (a) a C-frame;
   (b) at least one transmission housing coupled to the C-frame;
   (c) an electric motor;
   (d) a transmission coupled to the motor, at least a portion of the transmission being located in the transmission housing; and
   (e) a punch coupled to the transmission;
   wherein the transmission operably transmits rotary motion of the motor to linear motion of the punch to operably push the fastener.

2. The fastening system of claim 1 wherein the fastener is a self-piercing nut including a bore internally located in the body, and a thread is located in the bore.

3. The fastening system of claim 2 further comprising a bolt enmeshed with the bore of the fastener.

4. The fastening system of claim 1 further comprising an automotive body panel, an unthreaded portion of the fastener engaging with the automotive body panel after the fastener setting.

5. The fastening system of claim 1 further comprising a computer panel, an unthreaded portion of the fastener engaging with the computer panel after fastener setting.

6. The fastening system of claim 1 further comprising at least one sensor coupled to the machine and a controller connected to the machine, the sensor operably sensing a fastener characteristic and the controller automatically varying a fastener insertion feature of the machine in response to the fastener characteristic sensed.

7. The fastening system of claim 6 wherein the fastener characteristic is fastener size.

8. The fastening system of claim 6 wherein the fastener characteristic is fastener insertion force.

9. The fastening system of claim 6 wherein the fastener characteristic is fastener presence in the machine.

10. The fastening system of claim 6 wherein the fastener insertion feature is insertion speed, greater than zero.

11. The fastening system of claim 1 wherein the fastener is a self-piercing stud including a substantially cylindrical internal surface between a piercing end and a threaded segment prior to insertion in a workpiece.

12. The fastening system of claim 1 further comprising:
    a die attached to the C-frame, the die always being substantially aligned with the punch, the fastener being prevented from directly contacting the die, all of the die being stationary during joint creation; and
    a robotic arm coupled to at least one of the housing and the C-frame.

13. The fastening system of claim 1 wherein the fastener further comprises:
    an elongated shaft including the threads which have an external thread pattern with an outside diameter; and
    a workpiece-engaging section attached to the shaft at a proximal end and having a self-piercing distal end;
    the workpiece-engaging section having a pre-installed outside diameter substantially the same as that of the shaft and without an undercut prior to installation.

14. The fastening system of claim 13 wherein the distal end outwardly diverges when installed.

15. The fastening system of claim 13 wherein the workpiece-engaging section directly extends from the shaft free of a transversely enlarged flange.

16. The fastening system of claim 13 wherein the workpiece-engaging section is substantially hollow within a pre-installed substantially cylindrical wall, a roof of the workpiece-engaging section adjacent the shaft is substantially flat and parallel to an exposed end of the shaft.

17. A fastening system comprising:
    a threaded fastener;
    a machine automatically operable to drive the fastener, the machine comprising:
    (a) a C-frame;
    (b) at least one transmission housing coupled to the C-frame;
    (c) an electric motor;
    (d) a transmission coupled to the motor, at least a portion of the transmission being located in the transmission housing; and
    (e) a punch coupled to the transmission;
    wherein the transmission operably transmits rotary motion of the motor to linear motion of the punch to operably push the fastener; and
    a threaded member removably enmeshed with the fastener and a component secured to the fastener by the member.

18. The fastening system of claim 17 wherein a body of the fastener is a substantially cylindrical and elongated stud.

19. The fastening system of claim 17 wherein the component is an electrical connector.

20. The fastening system of claim 17 wherein the component is a circuit board.

21. A fastening system comprising:
    a threaded fastener; and
    a machine automatically operable to drive the fastener, the machine comprising:
    (a) a C-frame;
    (b) at least one transmission housing coupled to the C-frame;
    (c) an electric motor;
    (d) a transmission coupled to the motor, at least a portion of the transmission being located in the transmission housing; and
    (e) a punch coupled to the transmission;
    wherein the transmission operably transmits rotary motion of the motor to linear motion of the punch to operably push the fastener; and
    wherein the fastener is a self-piercing nut including a substantially cylindrical internal surface between a piercing end and a threaded segment prior to insertion in a workpiece.

22. The fastening system of claim 21 further comprising a stationary die always aligned with a punch of the machine, the die not having movable components.

23. The fastening system of claim 21 further comprising a sensor operably sensing a fastener characteristic and a controller automatically varying a fastener insertion feature of the machine in response to the fastener characteristic sensed.

24. The fastening system of claim 23 wherein the fastener characteristic is fastener size.

25. The fastening system of claim 23 wherein the fastener characteristic is fastener insertion force.

26. The fastening system of claim 23 wherein the fastener characteristic is fastener presence in the machine.

27. The fastening system of claim 23 wherein the fastener characteristic is fastener location relative to the workpiece.

28. The fastening system of claim 23 wherein the fastener characteristic is thickness of the workpiece.

29. The fastening system of claim 23 wherein the fastener insertion feature is insertion speed, greater than zero.

30. The fastening system of claim 23 wherein the fastener insertion feature is de-energization of the actuator.

31. A fastening system comprising:
at least a pair of automotive vehicle panels;
a clinch nut comprising a cylindrically tapered end which self-pierces into the panels and diverges during installation, the nut further comprising an internally threaded body;
a non-fluid powered actuator;
a driver operably inserting the nut into the panels;
a transmission coupling the actuator to the driver;
a sensor operably sensing a fastening characteristic; and
a controller automatically controlling installation of the fastener into the panels in response to the sensed fastening characteristic.

32. The fastening system of claim 31 wherein the fastener characteristic is fastener size.

33. The fastening system of claim 31 wherein the fastener characteristic is fastener insertion force.

34. The fastening system of claim 31 wherein the fastener characteristic is fastener location relative to the workpiece.

35. The fastening system of claim 31 further comprising:
a housing containing at least portions of the transmission and driver;
a C-frame attached to the housing;
a die attached to the C-frame, the die always being substantially aligned with the driver, all of the die being stationary during joint creation; and
a robotic arm coupled to at least one of the housing and the C-frame.

36. The fastening system of claim 31 wherein the actuator is an electric motor.

37. The fastening system of claim 31 wherein the transmission operably converts rotary motion of the actuator into linear motion of the driver.

* * * * *